United States Patent [19]

Lee

[11] Patent Number: 5,556,126
[45] Date of Patent: Sep. 17, 1996

[54] AIR BAG DEPLOYMENT DOOR

[75] Inventor: Chienhom Lee, Rochester Hills, Mich.

[73] Assignee: TRW Vehicle Safety Systems Inc., Lyndhurst, Ohio

[21] Appl. No.: 428,055

[22] Filed: Apr. 25, 1995

[51] Int. Cl.⁶ .................................. B60R 21/16
[52] U.S. Cl. ........................ 280/728.3; 280/732
[58] Field of Search ............... 280/728.3, 728.1, 280/732

[56] References Cited

U.S. PATENT DOCUMENTS

| | | |
|---|---|---|
| 4,893,833 | 1/1990 | DiSalvo et al. . |
| 4,925,209 | 5/1990 | Sakurai . |
| 4,989,897 | 2/1991 | Takada . |
| 5,031,930 | 7/1991 | Sato . |
| 5,301,966 | 4/1994 | Sakata . |
| 5,316,333 | 5/1994 | Kokeguchi . |
| 5,322,324 | 6/1994 | Hansen et al. . |
| 5,358,271 | 10/1994 | Watanabe et al. . |
| 5,374,078 | 12/1994 | Amamori et al. . |
| 5,374,079 | 12/1994 | Dukeshire et al. . |

*Primary Examiner*—Eric D. Culbreth
*Attorney, Agent, or Firm*—Tarolli, Sundheim, Covell, Tummino & Szabo

[57] ABSTRACT

An air bag module (12) includes an air bag (18), a reaction canister (22), and a deployment door (24). The reaction canister (22) has a deployment opening (34). The deployment door (24) includes a door panel (80) which extends across the deployment opening (34). The air bag (18) moves outward through the deployment opening (34) and forcefully against the door panel (80) when inflating. The deployment door (24) further includes a stress riser (98) and a hinge (180). The stress riser (98) is ruptured by the force of the air bag (18) moving against the door panel (80). The hinge (180) supports the door panel (80) for pivotal movement away from the deployment opening (34) when the stress riser (98) has been ruptured. The reaction canister (22) includes a spring clamp (160) which clamps the hinge (180) to the reaction canister (22). The spring clamp (160) dissipates energy by enabling the force of the air bag (18) to move the hinge (180) outward against a bias of the spring clamp (160).

13 Claims, 4 Drawing Sheets

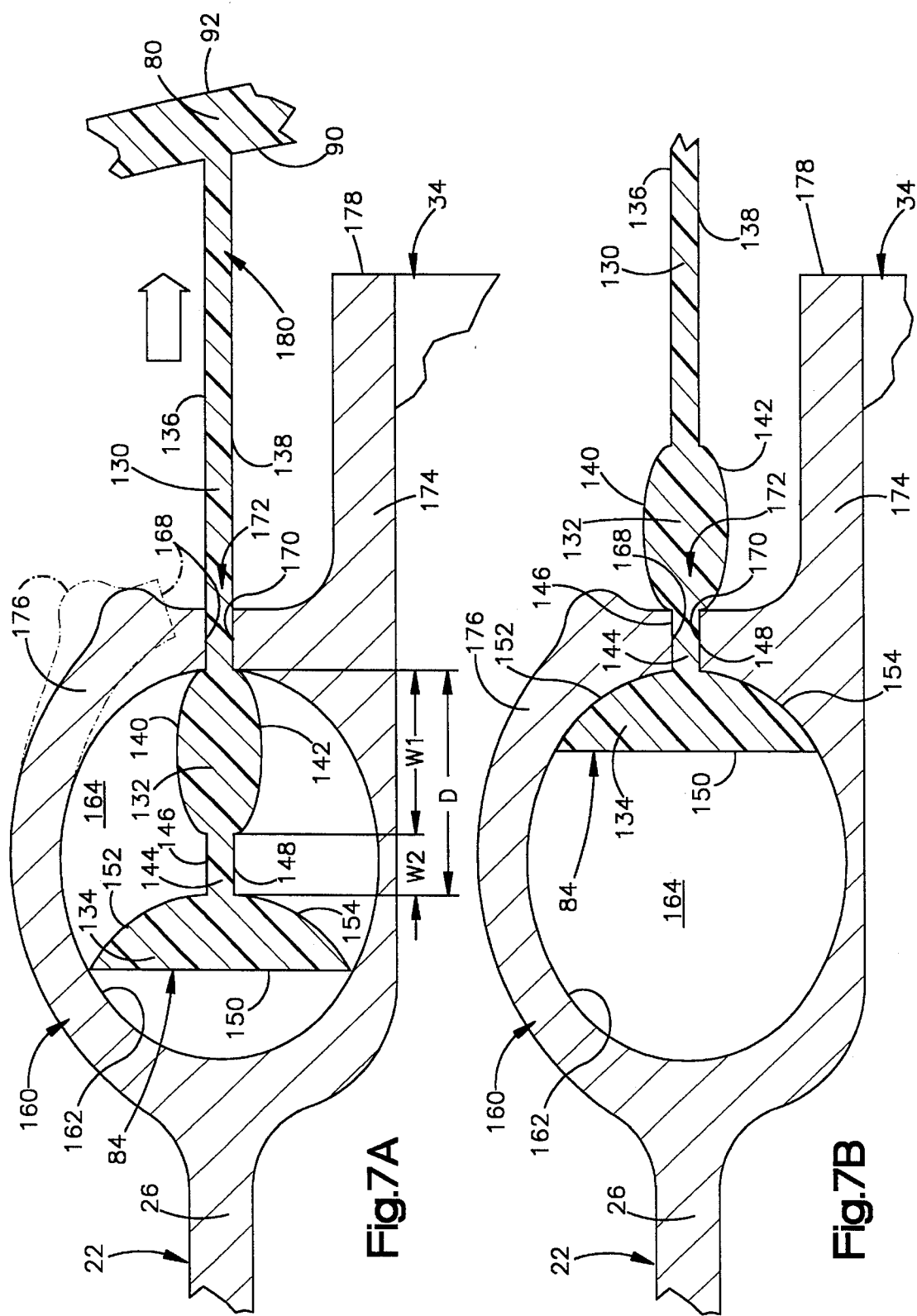

AIR BAG DEPLOYMENT DOOR

FIELD OF THE INVENTION

The present invention relates to a deployment door which is opened upon inflation of an air bag in a vehicle.

BACKGROUND OF THE INVENTION

An air bag is inflated to protect an occupant of a vehicle upon the occurrence of a vehicle collision. When the vehicle experiences a collision-indicating condition of at least a predetermined threshold level, an inflator is actuated. The inflator then emits inflation fluid which is directed to flow into the air bag. The inflation fluid inflates the air bag to an inflated condition in which the air bag extends into the vehicle occupant compartment. When the air bag is inflated into the vehicle occupant compartment, it restrains an occupant of the vehicle from forcefully striking parts of the vehicle as a result of the collision.

The air bag and the inflator are typically assembled together as parts of an air bag module. In addition to the air bag and the inflator, the module includes a reaction canister which contains and supports the air bag and the inflator in the vehicle. The reaction canister has a deployment opening through which the air bag moves outward from the reaction canister when the air bag is inflated. A deployment door extends over the deployment opening to conceal the air bag and the other parts of the module from the vehicle occupant compartment.

When the inflator is actuated, the reaction canister directs the inflation fluid to flow from the inflator into the air bag. As the inflation fluid enters the air bag, it moves the air bag outward through the deployment opening and forcefully against the deployment door. The deployment door is ruptured by the force of the fluid pressure in the air bag, and is thus released for movement away from the deployment opening. As the air bag continues to move outward against the deployment door, it forcefully deflects a hinge portion of the deployment door so as to move the deployment door pivotally away from the deployment opening. The deployment door is thus opened and moved pivotally out of the path of the air bag as the air bag inflates outward from the reaction canister through the deployment opening and into the vehicle occupant compartment.

SUMMARY OF THE INVENTION

In accordance with the present invention, an apparatus for use with an inflatable vehicle occupant restraint, such as an air bag, comprises means for defining a deployment opening, a door panel which extends across the deployment opening, and a stress riser. When the air bag is inflated, it moves in an outward direction through the deployment opening and forcefully against the door panel. The stress riser is ruptured by the force of the air bag moving against the door panel.

The apparatus further comprises hinge means and spring clamp means. The hinge means supports the door panel for pivotal movement away from the deployment opening when the stress riser has been ruptured. The spring clamp means clamps against the hinge means. When the air bag is inflated, the spring clamp means dissipates energy by enabling the force of the air bag to move the hinge means in the outward direction against a bias of the spring clamp means.

In a preferred embodiment of the present invention, the means for defining a deployment opening comprises a reaction canister which contains and supports the air bag in a vehicle. The reaction canister has an upper canister wall with a rigid portion and a flexible portion. The rigid portion of the upper canister wall partly defines the deployment opening. The flexible portion of the upper canister wall defines a movable spring arm which extends along the length of the upper canister wall. When the spring arm is in a first position, it blocks movement of the hinge means in the outward direction. When the spring arm is in a second position, it permits movement of the hinge means in the outward direction. The spring arm is movable relative to the rigid portion of the upper canister wall from the first position to the second position against the bias of the spring clamp means.

In the preferred embodiment of the present invention, the door panel, the stress riser, and the hinge means are all portions of a deployment door. The deployment door further includes a flange which projects inward from the door panel to the spring clamp means on the reaction canister. The hinge means comprises adjoining portions of the flange and the door panel. The spring arm presses the flange against the rigid portion of the upper canister wall when the spring arm is in the first position. The spring clamp means thus clamps the hinge means to the reaction canister.

The flange on the deployment door has a first head portion. The first head portion of the flange transmits the force of the inflating air bag from the hinge means to the spring arm so as to move the spring arm from the first position to the second position. Specifically, the first head portion of the flange has an arcuate cam surface which moves outward against the spring arm so as to move the spring arm upward to the second position under the influence of the force of the inflating air bag.

The flange further has a second head portion which is spaced inward from the first head portion. The second head portion of the flange limits movement of the flange outward from the spring clamp means. The flange on the deployment door, and hence the hinge means, is thus moved a predetermined distance outward from the spring clamp means by the force of the inflating air bag. Accordingly, the force of the inflating air bag acts through a distance so that work is performed and energy is dissipated. The dissipation of energy causes a reduction in the force that is applied to the hinge means by the inflating air bag. This helps to prevent the hinge means from breaking when the door panel is moved pivotally about the hinge means by the inflating air bag.

BRIEF DESCRIPTION OF THE DRAWINGS

Further features of the present invention will become apparent to those skilled in the art to which the present invention relates from reading the following description with reference to the accompanying drawings, in which:

FIG. 2 is a view showing the apparatus of FIG. 1 in an actuated condition;

FIG. 7A is an enlarged partial view of other parts shown in FIG. 1; and

FIG. 7B is a view showing the parts of FIG. 7A in different positions.

DESCRIPTION OF A PREFERRED EMBODIMENT

Figure 1:
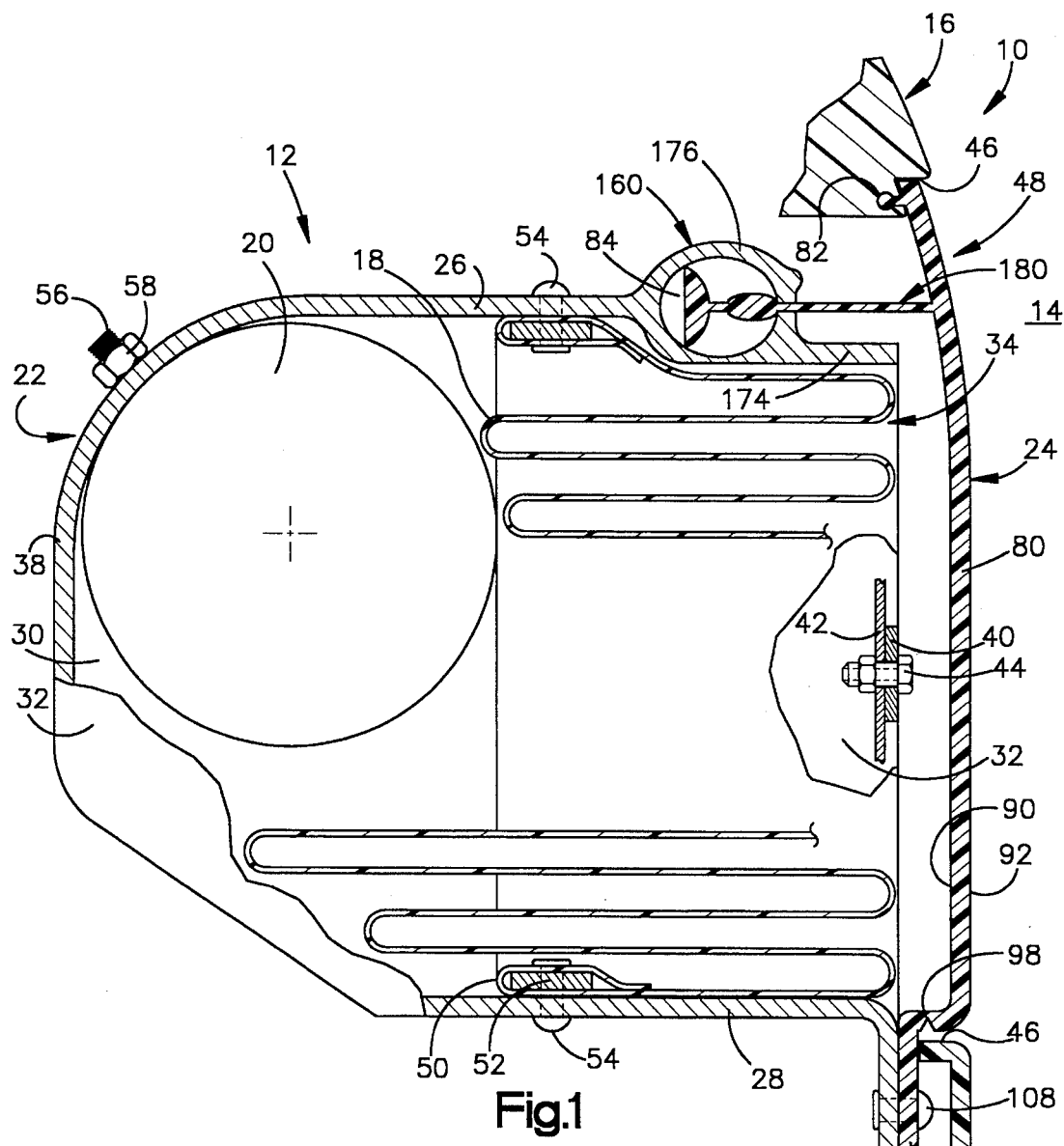
FIG. 1 is a schematic view of a vehicle occupant restraint apparatus comprising a preferred embodiment of the present invention.

As shown in FIG. 1, a vehicle occupant restraint apparatus 10 comprising a preferred embodiment of the present invention includes an air bag module 12. The air bag module 12 is mounted in a vehicle at a location adjacent to the vehicle occupant compartment 14, such as in the instrument panel 16 at the passenger side of the vehicle. The air bag module 12 includes an inflatable vehicle occupant restraint 18, which is commonly referred to as an air bag, and includes an inflator 20 for inflating the air bag 18.

When the inflator 20 is actuated, it inflates the air bag 18 from an uninflated condition, as shown fully in FIG. 1, to an inflated condition, as shown partially in FIG. 2. When the air bag 18 is in the inflated condition, it extends from the instrument panel 16 into the vehicle occupant compartment 14 to restrain movement of a vehicle occupant toward the instrument panel 16. The air bag 18 thus helps to protect the occupant from a forceful impact with the instrument panel 16 or other parts of the vehicle.

The air bag module 12 further includes a reaction canister 22 and a deployment door 24. The reaction canister 22 contains the air bag 18 and the inflator 20. The deployment door 24 conceals the other parts of the air bag module 12 from the vehicle occupant compartment 14.

The reaction canister 22 has an upper wall 26, a lower wall 28, and a pair of opposite side walls 30 and 32. The upper, lower, and side walls 26, 28, 30 and 32 of the reaction canister 22 together define a deployment opening 34 at the outer end of the reaction canister 22. A mounting flange portion 36 of the lower wall 28 projects downward from the deployment opening 34. An inner wall 38 closes the inner end of the reaction canister 22 opposite the deployment opening 34.

A plurality of mounting tabs 40, one of which is shown in FIG. 1, project from the reaction canister 22. The mounting tabs 40 are fixed to corresponding supporting parts 42 of the instrument panel 16 by fasteners 44. The structure and arrangement of the fasteners 44, the mounting tabs 40, and the supporting parts 42 of the instrument panel 16 can vary, as known in the art. The reaction canister 22 is mounted in the instrument panel 16 in a position in which the deployment opening 34 is closely spaced from a surrounding edge surface 46 of the instrument panel 16. The deployment opening 34 is thus located within a somewhat larger opening 48 defined by the edge surface 46 of the instrument panel 16.

As noted above, the air bag 18 is stored in the reaction canister 22 in the uninflated condition of FIG. 1. An open inner end portion 50 of the air bag 18 is wrapped around and secured to a retainer ring 52 in a known manner. The retainer ring 52 extends fully around the inside of the reaction canister 22 at a location between the inflator 20 and the deployment opening 34. A plurality of fasteners 54 securely fasten the retainer ring 52, and hence the inner end portion 50 of the air bag 18, to the surrounding walls 26, 28, 30 and 32 of the reaction canister 22 at that location.

The inflator 20 is an elongated cylindrical structure comprising a source of inflation fluid for inflating the air bag 18. As known in the art, the inflator 20 may contain an ignitable gas generating material which, when ignited, rapidly generates a large volume of gas. The inflator 20 may alternatively contain a stored quantity of pressurized inflation fluid, or a combination of pressurized inflation fluid and ignitable gas generating or heat generating material.

The inflator 20 extends longitudinally between the opposite side walls 30 and 32 of the reaction canister 22. A threaded mounting stud 56 on the inflator 20 projects radially outward through an opening (not shown) in the inner wall 38 of the reaction canister 22. A nut 58 on the mounting stud 56 attaches the inflator 20 securely to the reaction canister 22. Alternatively, the inflator 20 could be mounted in the reaction canister 22 by any other suitable mounting structure known in the art.

Figure 3:
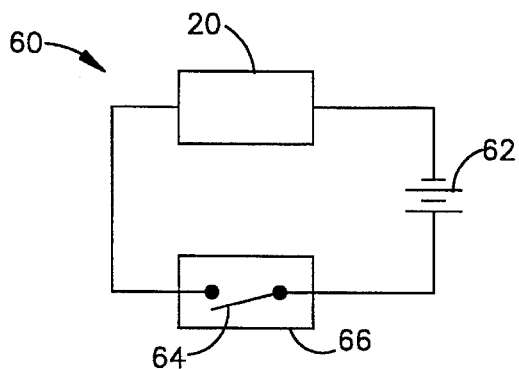
FIG. 3 is a schematic view of an electrical circuit including a part of the apparatus of FIG. 1.

As shown in FIG. 3, the inflator 20 is included in an electrical circuit 60. The electrical circuit 60 further includes a power source 62, which is preferably the vehicle battery and/or a capacitor, and a normally open switch 64. The switch 64 is part of a sensor 66 which senses a condition indicating the occurrence of a vehicle collision. The collision-indicating condition may comprise, for example, sudden vehicle deceleration caused by a collision. If the collision-indicating condition is above a predetermined threshold, it indicates the occurrence of a collision for which inflation of the air bag 18 is desired to protect an occupant of the vehicle. The sensor 66 then closes the switch 64 and the inflator 20 is actuated electrically.

When inflator 20 is actuated, it emits a large volume of inflation fluid into the reaction canister 22. The reaction canister 22 directs the inflation fluid from the inflator 20 into the air bag 18 to inflate the air bag 18 from the uninflated condition of FIG. 1 to the inflated condition of FIG. 2. As the air bag 18 begins to inflate, it moves rapidly outward from the reaction canister 22 through the deployment opening 34. The air bag 18 then moves forcefully against the deployment door 24 to open the deployment door 24, and continues to move outward into the vehicle occupant compartment 14 past the deployment door 24.

Figure 4:
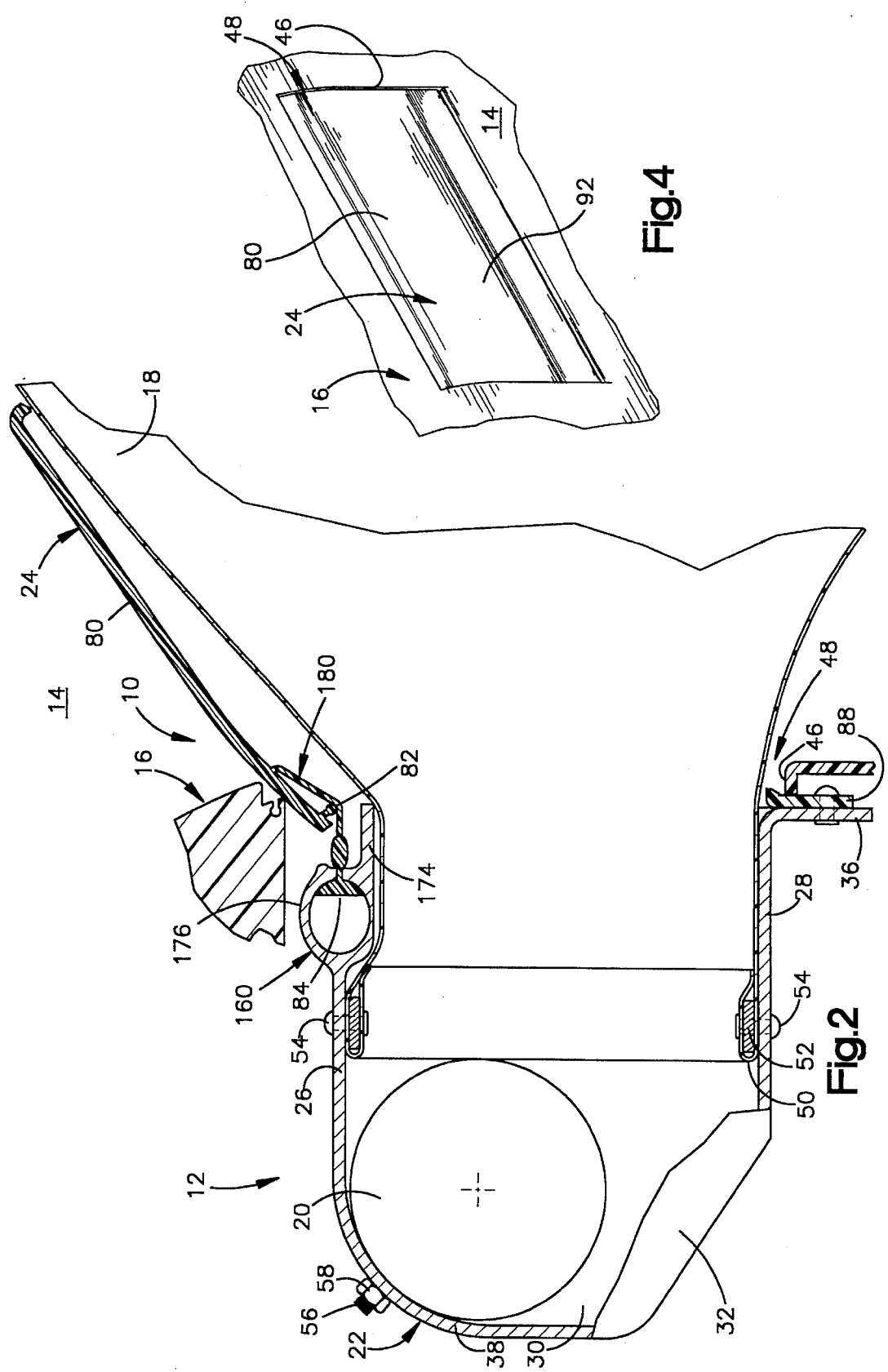
FIG. 4 is a perspective view of parts of the apparatus of FIG. 1.
Figure 5:
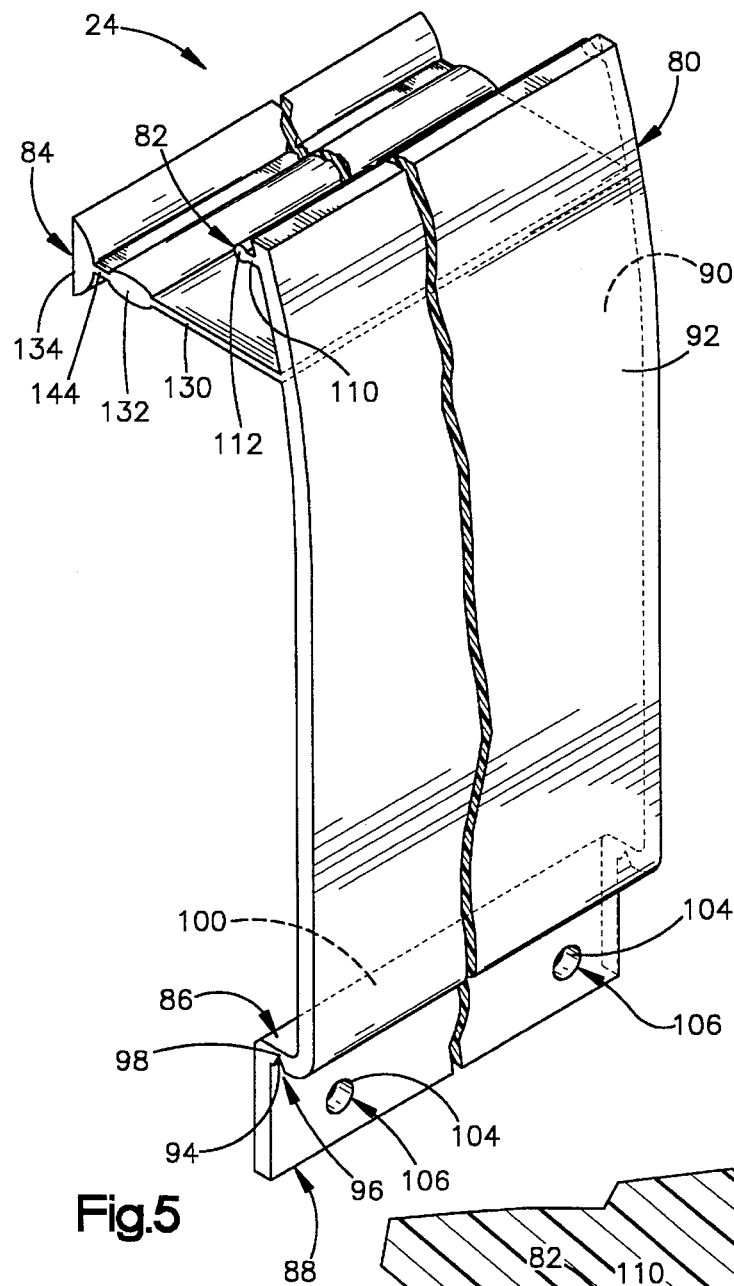
FIG. 5 is a perspective view of a part of the apparatus of FIG. 1.

As shown with the instrument panel 16 in FIG. 4, the deployment door 24 in the preferred embodiment of the present invention has a generally rectangular shape which is elongated horizontally. As shown separately in FIG. 5, the deployment door 24 is a unitary structure with a plurality of distinct portions. A door panel 80 comprises a major portion of the deployment door 24. Other portions of the deployment door 24 include a mounting bead 82, a mounting flange 84, and a pair of base portions 86 and 88.

The door panel 80 has inner and outer side surfaces 90 and 92. The inner side surface 90 faces inward toward the reaction canister 22 (FIG. 1) and the air bag 18. The outer side surface 92 faces outward toward the vehicle occupant compartment 14. As best shown in FIG. 4, the door panel 80 extends fully across the opening 48 in the instrument panel 16. The outer side surface 92 of the door panel 80 continues the trim theme of the instrument panel 16 across the opening 48.

The first base portion 86 of the deployment door 24 is shaped as a narrow rectangular strip and projects transversely inward from the bottom of the door panel 80. A recessed lower surface 94 of the first base portion 86 defines a notch 96 which extends along the entire length of the first base portion 86. An elongated stress riser 98 is thus defined by the relatively thin material of the deployment door 24 which is located between the recessed lower surface 94 and a planar upper surface 100. The stress riser 98 is rupturable under stress of at least a predetermined elevated level. Although the foregoing structure of the stress riser 98 is preferred, any other suitable structure for defining a stress riser can be used as an alternative.

The second base portion 88 of the deployment door 24 is shaped as a wider rectangular strip which is generally parallel to the door panel 80. The second base portion 88 extends longitudinally alongside the first base portion 86, and projects transversely downward from the inner end of the first base portion 86. A plurality of annular inner surfaces 104 of the second base portion 88 define a corresponding plurality of apertures 106. Each aperture 106 receives a respective fastener 108 (FIG. 1) for securely fastening the deployment door 24 to the mounting flange portion 36 of the reaction canister 22.

Figure 6:
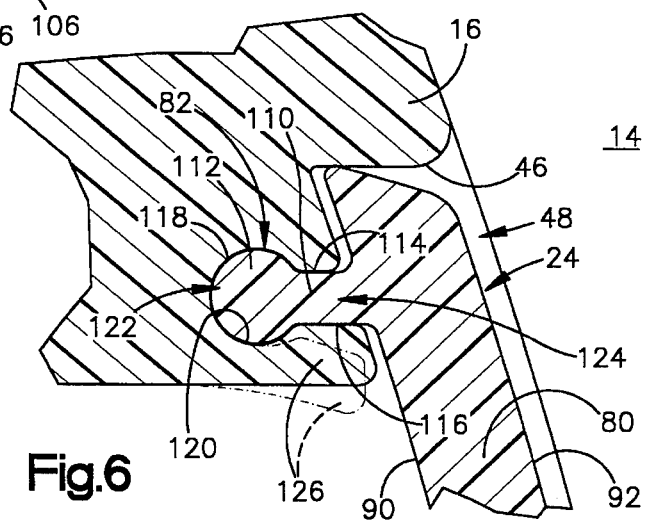
FIG. 6 is an enlarged partial view of parts shown in FIG. 1.

The mounting bead 82 projects a short distance inward from the door panel 80 near the top of the door panel 80. As shown in enlarged detail in FIG. 6, the mounting bead 82 has a web portion 110 and an enlarged head portion 112. The web portion 110 has planar opposite side surfaces 114 and 116. The side surfaces 114 and 116 have rectangular shapes which extend longitudinally alongside the door panel 80, and which project transversely inward from the inner side surface 90 of the door panel 80. The head portion 112 of the mounting bead 82 has a cylindrical peripheral surface 118 extending circumferentially between the opposite side surfaces 114 and 116 of the web portion 110.

As shown in FIG. 1, the mounting bead 82 engages the instrument panel 16 near the top of the opening 48 in the instrument panel 16. As shown in enlarged detail in FIG. 6, the instrument panel 16 has a recessed surface 120. The recessed surface 120 defines a cylindrical groove 122 with a narrow, slot-shaped opening 124. The head 112 on the mounting bead 82 is received closely in the groove 122. The web 110 on the mounting bead 82 extends closely through the opening 124.

A lip portion 126 of the instrument panel 16 extends along the length of the groove 122. The lip 126 is flexible between a first position, as shown in solid lines in FIG. 6, and a second position, as shown in broken lines in FIG. 6. The lip 126 enables the mounting bead 82 to be engaged with the instrument panel 16 by pressing the head 112 forcefully inward of the opening 124 to flex the lip 126 downward from the first position to the second position, and thereby to enlarge the opening 124 sufficiently for the head 112 to move fully into the groove 122 through the opening 124. The lip 126 likewise enables the mounting bead 82 to be disengaged from the instrument panel 16 upon subsequent movement of the head 112 forcefully outward against the lip 126 and further outward through the opening 124.

The mounting flange 84 also projects horizontally inward from the door panel 80. As shown in enlarged detail in FIG. 7A, the mounting flange 84 has a body portion 130, a first head portion 132 and a second, larger head portion 134. The body portion 130 of the mounting flange 84 has planar opposite side surfaces 136 and 138. The side surfaces 136 and 138 have rectangular shapes which extend longitudinally alongside the door panel 80, and which project transversely inward from the inner side surface 90 of the door panel 80.

The first head portion 132 of the mounting flange 84 has convex opposite side surfaces 140 and 142 with rectangular peripheral shapes. The side surfaces 140 and 142 have equal lengths extending along the length of the mounting flange 84. The side surfaces 140 and 142 also have equal widths extending inward across the mounting flange 84 from the side surfaces 136 and 138 of the body portion 130, respectively. The first head portion 132 thus has a substantially oval cross-sectional shape with a width W1, which is measured in a direction transversely across the mounting flange 84, and which is defined by the opposite side surfaces 140 and 142.

A spacer portion 144 of the mounting flange 84 is located between the first head portion 132 and the second head portion 134. The spacer portion 144 has planar opposite side surfaces 146 and 148 which are co-planar with the opposite side surfaces 136 and 138 of the body portion 130. The side surfaces 146 and 148 of the spacer portion 144 have rectangular shapes with equal lengths extending along the length of the mounting flange 84, and with equal widths extending inward across the mounting flange 84 from the side surfaces 140 and 142 of the first head portion 132, respectively. The spacer portion 144 thus has a rectangular cross-sectional shape with a width W2, which also is measured in a direction transversely across the mounting flange 84, and which is defined by the opposite side surfaces 146 and 148. Accordingly, the second head portion 134 of the mounting flange 84 is spaced transversely from the body portion 130 a distance D which is equal to the sum of the widths W1 and W2.

The second head portion 134 of the mounting flange 84 has a planar inner end surface 150 and a pair of arcuate opposite side surfaces 152 and 154. The inner end surface 150 is perpendicular to the side surfaces 146 and 148 of the spacer portion 144. The side surfaces 152 and 154 extend between the spacer portion 144 and the inner end surface 150. The second head portion 134 thus has a substantially semicircular cross-sectional shape.

As shown in FIG. 1, the mounting flange 84 on the deployment door 24 engages the upper wall 26 of the reaction canister 22 above the deployment opening 34 in the reaction canister 22. More specifically, the mounting flange 84 is engaged with a spring clamp 160 on the upper wall 26. The spring clamp 160 extends along the length of the upper wall 26, and is preferably constructed as a continuous, integral portion of the upper wall 26.

As shown in FIG. 7, an arcuate inner surface 162 of the spring clamp 160 defines a channel 164 with a substantially oval cross-sectional shape. A pair of opposed planar surfaces 168 and 170 of the spring clamp 160 define a narrow, slot-shaped opening 172 extending along the length of the channel 164. The mounting flange 84 extends into the channel 164 through the opening 172. The opposite ends (not shown) of the spring clamp 160 are open. The mounting flange 84 is moved into engagement with the spring clamp 160 by sliding the mounting flange 84 longitudinally inward through one of the open ends of the spring clamp 160.

The spring clamp 160 has a rigid base 174 and a flexible spring arm 176. The base 174 includes an outer edge surface 178 of the upper canister wall 26 which defines the top of the deployment opening 34. The base 174 also includes the lower planar surface 170 at the opening 172 in the spring clamp 160. The spring arm 176 includes the upper planar surface 168 at the opening 172.

The spring arm 176 is flexible relative to the base 174 from a first position, as shown in solid lines in FIG. 7A, to a second position, as shown in broken lines in FIG. 7A, against a bias of the spring clamp 160. When the spring arm 176 is in the second position, the upper surface 168 at the opening 172 is spaced from the lower surface 170 so that the opening 172 is enlarged. The opening 172 is then large enough for the first head portion 132 of the mounting flange 84 to be moved outward from the channel 164 through the opening 172. When the spring arm 176 is in the first position, the opening 172 is not large enough for the first head portion 132 to be moved outward through the opening 172. Preferably, the surface 168 on the spring arm 176 presses the body 130 of the mounting flange 84 firmly against the surface 170 on the base 174 when the spring arm 176 is in the first position. The spring clamp 160 thus clamps the mounting flange 84 to the reaction canister 22.

As described above, the air bag 18 moves outward against the deployment door 24 when the air bag 18 is being inflated from the condition of FIG. 1 toward the condition of FIG. 2. The inflation fluid in the air bag 18 then causes the air bag 18 to apply a fluid pressure force to the inner side surface 90 of the door panel 80. Some components of the fluid pressure force are transmitted within the deployment door 24 from the door panel 80 to the base portions 86 and 88. This induces stress in the stress riser 98 in the first base portion 86. When the stress reaches the predetermined elevated level, the stress riser 98 ruptures fully along its entire length.

Other components of the fluid pressure force applied to the door panel 80 are transmitted to the mounting flange 84. As indicated by the arrow shown in FIG. 7A, this causes the first head portion 132 of the mounting flange 84 to be pulled forcefully outward from the channel 164 through the opening 172. The convex upper side surface 140 of the first head portion 132 acts as a cam surface which lifts the spring arm 176 upward to the second position against the bias of the spring clamp 160 so as to enlarge and pass through the opening 172. When the first head portion 132 emerges from the opening 172, the spring arm 176 moves back to the first position under the influence of the bias of the spring clamp 160. The opposed surfaces 168 and 170 at the opening 172 then abut the opposite side surfaces 146 and 148 of the spacer portion 144. The opposite side surfaces 152 and 154 of the second head portion 134 act as stop surfaces which move against the arcuate inner clamp surface 162 on opposite sides of the opening 172. The mounting flange 84 is thus moved the predetermined distance D outward from the spring clamp 160 by the force of the air bag 18 moving against the door panel 80.

When the mounting flange 84 is moved forcefully outward from the spring clamp 160 in the foregoing manner, a force acts through a distance. Therefore, work is performed and energy is dissipated. The amount of energy that is dissipated is determined mostly by the force required for the first head portion 132 of the mounting flange 84 to move the spring arm 176 from the first position to the second position against the bias of the spring clamp 160. The amount of energy that is dissipated is thus determined mostly by the bias of the spring clamp 160.

The fluid pressure force applied to the door panel 80 by the inflating air bag 18 also acts to disengage the mounting bead 82 from the instrument panel 16. As the air bag 18 continues to inflate, it moves the door panel 80 pivotally to the position of FIG. 2. A hinge portion 180 of the deployment door 24 deflects, as shown in FIG. 2, upon such pivotal movement of the door panel 80. The hinge portion 180 comprises the body 130 of the mounting flange 84, and further comprises an adjacent portion of the door panel 80 at the juncture of the door panel 80 with the body 130. Therefore, the hinge portion 180 moves outward with the mounting flange 84 when the mounting flange 84 moves outward from the spring clamp 160. Breakage at the hinge portion 180, as well as undesirable breakage elsewhere in the deployment door 24, is avoided by the dissipation of energy that occurs upon such movement of the hinge portion 180 with the mounting flange 84.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for use with an inflatable vehicle occupant restraint, said apparatus comprising:

means for defining a deployment opening through which the restraint moves in an outward direction upon inflation of the restraint;

a door panel which extends across said deployment opening and against which the restraint moves forcefully upon inflation of the restraint;

a stress riser which is ruptured by the force of the restraint moving against said door panel;

hinge means for supporting said door panel for pivotal movement away from said deployment opening when said stress riser has been ruptured; and spring clamp means for clamping against said hinge means and for dissipating energy by enabling said force to move said hinge means in said outward direction against a bias of said spring clamp means.

2. Apparatus as defined in claim 1 wherein said spring clamp means includes a movable spring member, said spring member having a first position blocking movement of said hinge means in said outward direction and a second position not blocking movement of said hinge means in said outward direction, said spring member being movable from said first position to said second position under the influence of said force acting against said bias.

3. Apparatus as defined in claim 2 further comprising force transmitting means for transmitting said force from said hinge means to said spring member so as to move said spring member from said first position to said second position under the influence of said force.

4. Apparatus as defined in claim 3 wherein said spring clamp means and said force transmitting means together define a predetermined total distance through which said force can move said hinge means in said outward direction.

5. Apparatus as defined in claim 4 wherein said spring member returns from said second position to said first position during movement of said hinge means through said total distance.

6. Apparatus for use with an inflatable vehicle occupant restraint, said apparatus comprising:

canister means for containing and supporting the restraint in a vehicle, said canister means defining a deployment opening through which the restraint moves in an outward direction upon inflation of the restraint; and a deployment door including a door panel which extends across said deployment opening and against which the restraint moves forcefully upon inflation of the restraint, said deployment door further including a stress riser and hinge means, said stress riser being ruptured by the force of the restraint moving against said door panel, said hinge means supporting said door panel for pivotal movement away from said deployment opening when said stress riser has been ruptured;

said canister means including spring clamp means for clamping said deployment door to said canister means and for dissipating energy by enabling said force to move said hinge means in said outward direction against a bias of said spring clamp means.

7. Apparatus as defined in claim 6 wherein said canister means includes an upper canister wall with a rigid portion and a flexible portion, said rigid portion partly defining said deployment opening, said flexible portion defining a spring arm with a first position blocking movement of said hinge means in said outward direction and a second position not blocking movement of said hinge means in said outward direction, said spring arm being movable relative to said rigid portion of said upper canister wall from said first position to said second position under the influence of said force acting against said bias.

8. Apparatus as defined in claim 7 wherein said deployment door has a flange projecting inward from said door panel to said spring clamp means, said hinge means comprising a portion of said flange, said spring arm pressing said flange against said rigid portion of said upper canister wall when said spring arm is in said first position.

9. Apparatus as defined in claim 8 wherein said spring arm is elongated in a direction extending along the length of said flange.

10. Apparatus as defined in claim 8 wherein said flange includes means for transmitting said force from said hinge means to said spring arm so as to move said spring arm from said first position to said second position under the influence of said force.

11. Apparatus as defined in claim 10 wherein said means for transmitting said force comprises a first head portion of said flange, said first head portion of said flange having a cam surface which moves against said spring arm so as to move said spring arm from said first position to said second position under the influence of said force.

12. Apparatus as defined in claim 11 wherein said spring arm returns from said second position to said first position upon movement of said cam surface past said spring arm.

13. Apparatus as defined in claim 11 wherein said flange has a second head portion which is spaced inward from said first head portion, said second head portion of said flange comprising means for limiting movement of said hinge means in said outward direction.

* * * * *